(12) United States Patent
Lee et al.

(10) Patent No.: US 7,450,168 B1
(45) Date of Patent: Nov. 11, 2008

(54) DIGITAL CAMERA HAVING FLASH MEMORY FOR SETTING START INFORMATION SIGNAL AND METHOD OF CONTROLLING THE DIGITAL CAMERA

(75) Inventors: Byoung-kyu Lee, Seongsnam-si (KR); Kun-sop Kim, Seongsnam-si (KR); Yun-cheal Kim, Seongsnam-si (KR); Won-kyu Jang, Seoul (KR)

(73) Assignee: Samsung Techwin Co., Ltd. (KR)

( * ) Notice: Subject to any disclaimer, the term of this patent is extended or adjusted under 35 U.S.C. 154(b) by 790 days.

(21) Appl. No.: 10/618,767

(22) Filed: Jul. 14, 2003

(30) Foreign Application Priority Data

Jul. 13, 2002 (KR) ............... 10-2002-0040972

(51) Int. Cl.
*H04N 5/222* (2006.01)
(52) U.S. Cl. ............... 348/333.02; 348/222.1
(58) Field of Classification Search ........... 348/333.02, 348/222.1, 333.01, 208.15
See application file for complete search history.

(56) References Cited

U.S. PATENT DOCUMENTS

| | | | |
|---|---|---|---|
| 5,835,136 A * | 11/1998 | Watanabe et al. ........ 348/213.9 |
| 6,167,469 A * | 12/2000 | Safai et al. ............... 348/211.3 |
| 6,438,320 B1 * | 8/2002 | Hatanaka ................... 386/117 |
| 7,019,778 B1 * | 3/2006 | Prabhu et al. .......... 348/333.01 |
| 2003/0030732 A1 * | 2/2003 | Asada ..................... 348/231.4 |
| 2004/0001708 A1 * | 1/2004 | Hatori ....................... 396/310 |

* cited by examiner

*Primary Examiner*—David Ometz
*Assistant Examiner*—Gevell Selby
(74) *Attorney, Agent, or Firm*—Tuchman & Park LLC

(57) ABSTRACT

Provided is a digital camera which displays an object image while generating a digital image signal from light received from the object, stores the digital image signal in a memory card attachable to the camera, and reproduces a start information signal, which is set up by the user, preferably at the point of time when power is applied. The digital camera further includes a flash memory. Sound recording data inputted by the user, image data stored in the memory card, sound recording data stored in the flash memory, or image data stored in the flash memory can be set up as a start information signal, and data regarding the set-up of start information signal is stored in the flash memory.

17 Claims, 6 Drawing Sheets

DIGITAL CAMERA HAVING FLASH MEMORY FOR SETTING START INFORMATION SIGNAL AND METHOD OF CONTROLLING THE DIGITAL CAMERA

CROSS-REFERENCES TO RELATED APPLICATIONS

This application claims the priority of Korean Patent Application No. 2002-40972, filed Jul. 13, 2002, which is incorporated herein in its entirety by reference.

BACKGROUND OF THE INVENTION

1. Field of the Invention

The present invention relates to a digital camera and a method of controlling the digital camera, and more particularly, to a digital camera and a method of controlling the digital camera which can reproduce or display a start information signal, for example, a start-sound and/or a start-image, which is previously set up by the user.

2. Description of the Related Art

Typical digital cameras include an optical system, a photoelectric converter, an analog-to-digital converter, a digital signal processor, a display device, a memory card interface, and a controller. The optical system optically processes light received from an object. The photoelectric converter converts the light received from the optical system into an analog electric signal. The analog-to-digital converter converts the analog signal received from the photoelectric converter into a digital signal. The digital signal processor processes the digital signal received from the analog-to-digital converter and provides a processed digital signal. The display device displays the image of the object according to the digital image signal received from the digital signal processor. The user operates the digital camera so that the digital image signal output by the digital signal processor is stored in a memory card of the user via the memory card interface. The user operates the digital camera so that the digital image signal stored in the memory card is transmitted to the display device via the memory card interface and the digital signal processor. The controller controls the functions of the digital camera in response to a command signal originated from the user.

In such a known digital camera, for example, as disclosed in U.S. Pat. No. 6,167,469, users must execute a specific application program in a personal computer and download a start-sound or start-image, which is a start information signal, in order to set a new start-sound and a new start-image to be reproduced when power is applied. Hence, setting a new start information signal is burdensome to users, and a desired start information signal cannot be promptly set during photographing outside.

SUMMARY OF THE INVENTION

The present invention provides a digital or electronic camera and a method of controlling the electronic camera which enables users to immediately set up a start information signal, thus enhancing the user's convenience.

According to an aspect of the present invention, an electronic camera is provides which comprises: a display unit for presenting information and a graphic representation of an object image taken by the camera; a rewritable memory for storing information signals including a plurality of frames of image information; and wherein the camera allows selection of a start information signal through the display unit from the information signals stored in the rewritable memory. Preferably, the rewritable memory is further capable of storing information signals including a sound representation. The camera may further allow recording of a new sound to be usable as a start information signal. Preferably, the camera further includes an external memory medium attachable to the camera and for storing information signals taken by the camera including a plurality of frames of image information. Preferably, the external memory medium is further capable of storing information signals including a sound representation.

According to another aspect of the present invention, a method of operating a digital or electronic camera is provided, wherein the camera displays an object image while generating a digital image signal from light received from the object, stores the digital image signal in a memory medium attachable to the camera, and is capable of reproducing a start information signal which can be set up by the user. The method of the invention comprises the steps of: setting up a start information signal by selecting from a group consisting of a sound data recorded by the user, image data stored in the memory medium, sound data stored in a flash memory of the camera, or image data stored in the flash memory; and storing data regarding the set-up of the start information signal in the flash memory. Accordingly, this method includes a start information signal setting step and a start information signal storing step. In the start information signal setting step, sound recording data inputted by the user, image data stored in the memory medium (e.g., memory card), sound recording data stored in the rewritable memory (e.g., flash memory), or image data stored in the flash memory can be set up as a start information signal. In the start information signal storing step, data regarding the set-up start information signal is stored in the flash memory.

In the digital camera according to the present invention and the method of controlling the digital camera, set-up data regarding a start information signal is stored in the flash memory. Also, sound recording data selected or inputted by a user, image data stored in the memory card, sound recording data stored in the flash memory, or image data stored in the flash memory can be set up as the start information signal. Since users can immediately set up a start information signal, the user's convenience is enhanced.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
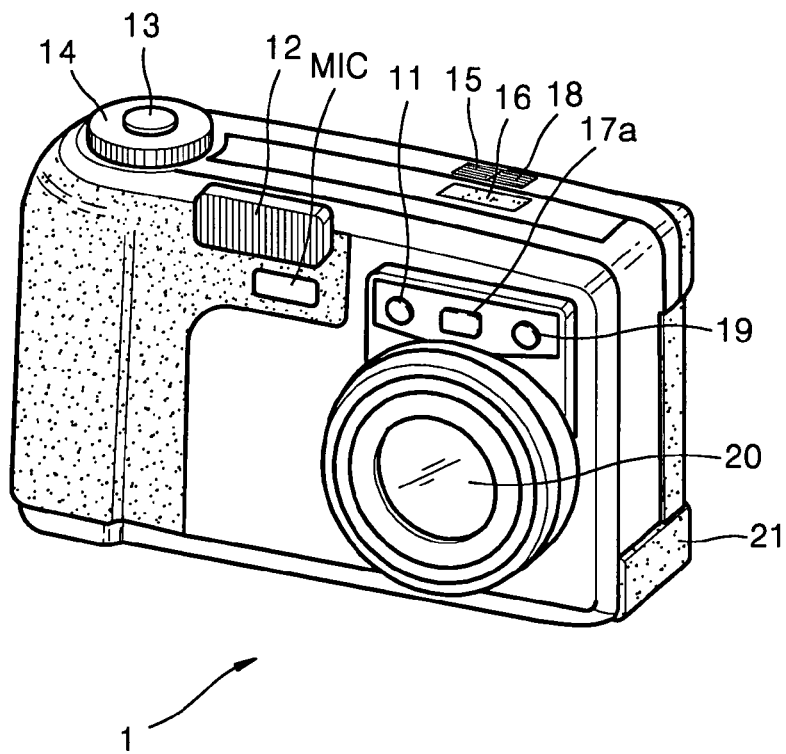
FIG. 1 is a perspective view of a digital camera according to the present invention.

Referring to FIG. 1, the front side of a digital camera 1 according to the present invention includes a self-timer lamp 11, a flash 12, a shutter button 13, a mode dial 14, a function-selection button 15, a photographing information display unit 16, a view finder 17a, a function-block button 18, a flash-light amount sensor 19, a lens unit 20, an external interface 21, and a microphone (MIC).

The self-timer lamp 11 turns on in a self-timer mode for a set period of time from when the shutter button 13 is pressed to when a shutter starts to operate. The mode dial 14 is used by a user to select and set up various modes, for example, a start-sound/image setting mode, a still image photographing mode, a night view photographing mode, a moving image photographing mode, a reproduction mode, a computer connection mode, and a system setting mode. The function-selection button 15 is used by the user to select a desired one from the operating modes of the digital camera 1, for example, a still image photographing mode, a night view photographing mode, a moving image photographing mode, and a reproduction mode. The photographing information display unit 16 displays a variety of photographing related information. The function-block button 18 is used by the user to select a function if a status display panel which displays the operation status of each function exists. The digital camera 1 of FIG. 1 does not include a status display panel.

Figure 2:
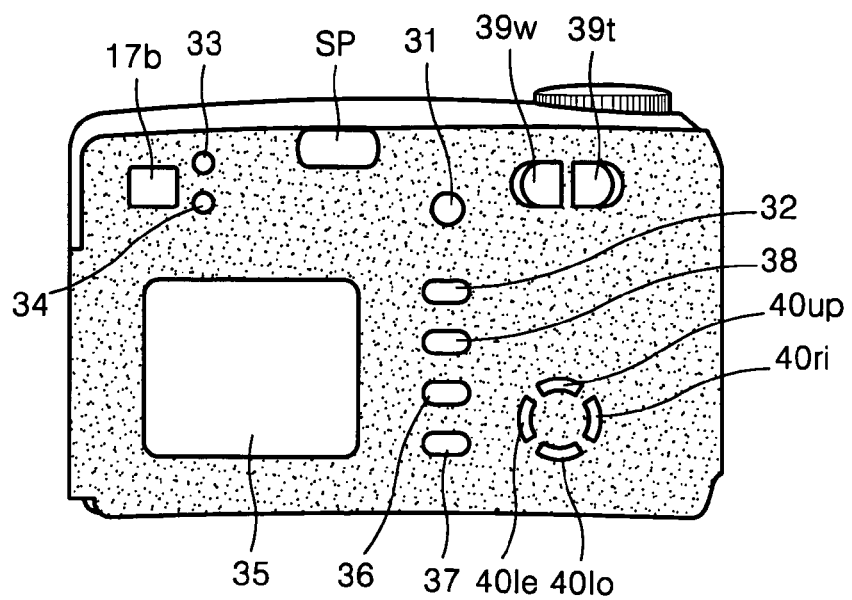
FIG. 2 is a rear view of the digital camera of FIG. 1.

Referring to FIG. 2, the rear side of the digital camera 1 includes a power button 31, a monitor button 32, an auto-focusing lamp 33, a view finder 17b, a flash standby lamp 34, a display panel 35, a confirmation/cancellation button 36, an enter/reproduction button 37, a menu button 38, a wide angle zoom button 39w, a telephoto-zoom button 39t, a moving-up button 40up, a moving-right button 40ri, a moving-down button 40lo, and a moving-left button 40le, and a speaker SP.

The monitor button 32 is used by the user to control the operation of the display panel 35. In the preferred embodiment, if the user presses down the monitor button 32 the first time after power is applied, for example, the image of the object and information about the photographing features of the object are displayed on the display panel 35. If the user presses down the monitor button 32 the second time, only the image of the object is displayed on the display panel 35. If the user presses down the monitor button 32 the third time, power applied to the display panel 35 is disconnected. The auto-focusing lamp 33 turns on when it is in complete focus. The flash standby lamp 34 turns on when the flash 12 of FIG. 1 is in an operation standby state. The confirmation/cancellation button 36 is used as either a confirmation button or a cancellation button when the user sets up each mode. The enter/reproduction button 37 is used by the user to input data or to achieve stop or reproduction in a reproduction mode. The menu button 3 is used to display a menu corresponding to a mode selected by the mode dial 14. The moving-up button 40up, the moving-right button 40ri, the moving-down button 40lo, and the moving-left button 40le are used when the user sets up each mode, similar to the confirmation/cancellation button 36.

Figure 3:
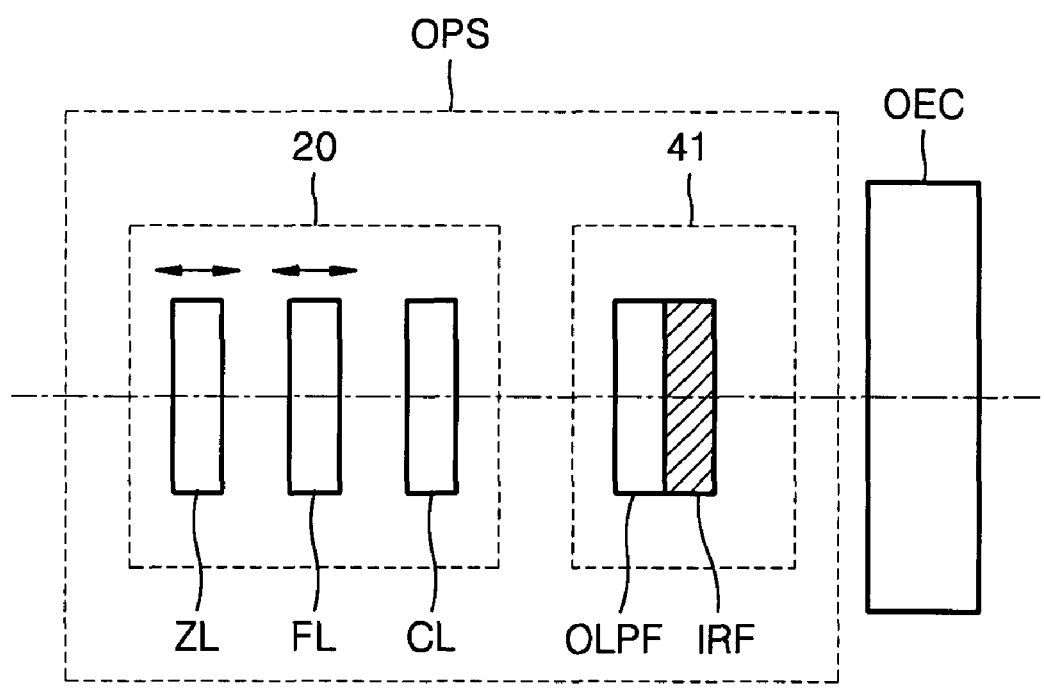
FIG. 3 is a schematic representation of the optical system of the digital camera of FIG. 1.
Figure 4:
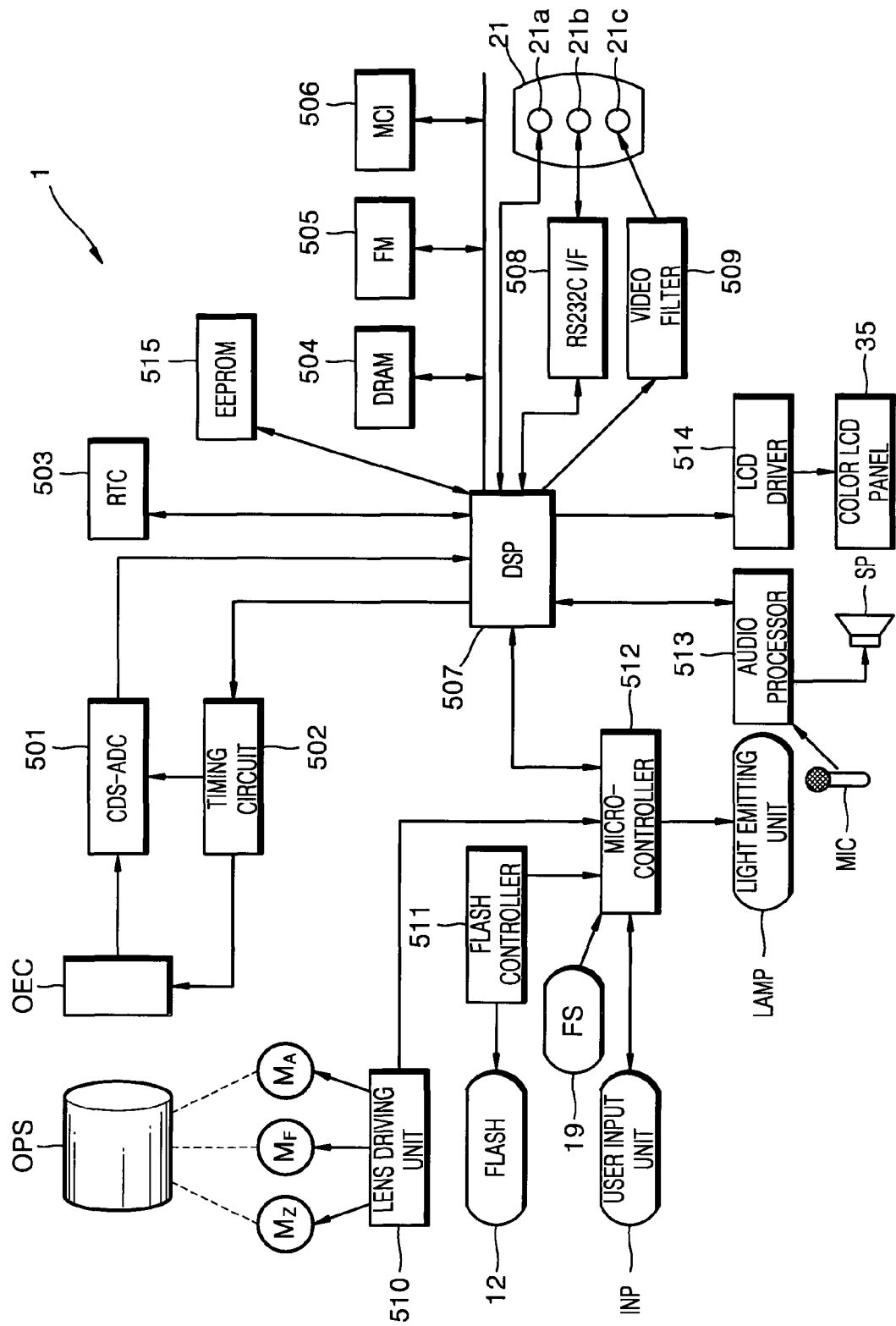
FIG. 4 a block diagram of the entire construction of the digital camera of FIG. 1.

Referring to FIGS. 3 and 4, the entire functions of the digital camera 1 of FIG. 1 will now be described. An optical system OPS having the lens unit 20 and a filter unit 41 optically processes light received from an object.

The lens unit 20 includes a zoom lens ZL, a focusing lens FL, and a compensation lens CL.

When a user depresses the wide angle zoom button 39w of FIG. 2 or the telephoto zoom button 39t of FIG. 2, which are included in a user input unit INP, a signal corresponding to the operation of the wide angle zoom button 39w or the telephoto zoom button 39t is applied to a micro-controller 512. As the micro-controller 512 controls the operation of a lens driver 510, a zoom motor ($M_Z$) is driven, and the zoom lens ZL moves. In other words, if the wide angle zoom button 39w is depressed, the focal length of the zoom lens ZL is shortened, and accordingly, the angle of view of the zoom lens widens. If the telephoto zoom button 39t is depressed, the focal length of the zoom lens ZL increases, and accordingly, the angle of view of the zoom lens narrows. Due to this characteristic, the micro-controller 512 can obtain the angle of view associated with the location of the zoom lens ZL from the design data of the optical system OPS. Because the location of the focusing lens FL is adjusted when the location of the zoom lens ZL has been set, the angle of view is hardly affected by the location of the focusing lens FL.

When the object is focused automatically or manually, the current location of the focusing lens FL changes depending on the distance to the object. Hence, the micro-controller 512 can obtain the distance between the object and the focusing lens FL from the design data of the optical system OPS. In an automatic focusing mode, a focusing motor ($M_F$) is driven by the operation of a lens driving unit 510 controlled by the micro-controller 512. As a result, the focusing lens FL moves from the front end to the rear end of its moving range. During this process, the location of the focusing lens FL is determined, for example, by the number of driving steps of the focusing motor ($M_F$), where the greatest amount of radio frequency component of the image signal exists.

The compensation lens CL is not driven independently since it compensates for the overall refractive index. Reference character MA denotes a motor for driving an aperture (not shown).

In the filter unit 41 of the optical system OPS, an optical low pass filter OLPF removes optical noise of the radio frequency component from incident light. An infrared cut filter IRF cuts an infrared component off from incident light.

The photoelectric converter OEC of a charge coupled device (CCD) or a complementary metal-oxide-semiconductor (CMOS) converts light received from the OPS into an electrical analog signal. A digital signal processor (DSP) 507 controls a timing circuit 502 to control the operations of the photoelectric converter OEC and a correlation double sampler and analog-to-digital converter (CDS-ADC) 501. The CDS-ADC 501 processes an analog signal received from the photoelectric converter OEC to remove radio frequency noise from the analog signal, adjust the amplitude of the analog signal, and convert the resulting analog signal into a digital signal. The DSP 507, which operates under control of the micro-controller 512, processes the digital signal received from the CDS-ADC 501 so that the digital signal is divided into a luminance signal and a chrominance signal.

A light emitting unit LAMP, which is driven by the micro-controller 512, includes a self-timer lamp 11, the auto-focusing lamp 33 of FIG. 2, and the flash standby lamp 34 of FIG. 2. The user input unit INP includes the shutter button 13 of FIG. 1, the mode dial 14 of FIG. 1, the function-selection button 15 of FIG. 1, the function-block button 18 of FIG. 1, the monitor button 32 of FIG. 2, the confirmation/cancellation button 36 of FIG. 2, the enter/reproduction button 37 of FIG. 2, the menu button 38 of FIG. 2, the wide angle zoom button 39w of FIG. 2, the telephoto-zoom button 39t of FIG. 2, the moving-up button 40up of FIG. 2, the moving-right button 40ri of FIG. 2, the moving-down button 40lo of FIG. 2, and the moving-left button 40le of FIG. 2.

A dynamic random access memory (DRAM) 504 temporarily stores the digital image signal received from the DSP 507. An electrically erasable programmable read only memory (EEPROM) 515 stores algorithms and setup data, which are necessary for the operation of the DSP 507. A memory card of a user is attached to or detached from a memory card interface 506.

The digital image signal output from the DSP 507 is applied to an LCD driver 514, and accordingly, an object image is displayed on a color LCD panel 35.

Alternatively, the digital image signal output from the DSP 507 can be transmitted in a serial communication manner, for example, via either a universal serial bus (USB) connector 21a or an RS232C interface 508 and its connector 21b. Alternatively, the digital image signal output from the DSP 507 may pass through a video filter 509 and a video output unit 21c and be transmitted as a video signal.

An audio processor 513 outputs an audio signal received from a microphone MIC to the DSP 507 or a speaker SP and outputs the audio signal received from the DSP 507 to the speaker SP.

Meanwhile, the micro-controller 512 controls the operation of a flash controller 511 according to a signal received from the flash-light amount sensor 19 of FIG. 1 and drives the electric flash 12 of FIG. 1.

A flash memory 505 stores start-sound data and start-image data, whenever a start-sound signal and a start-image signal are set by a user, preferably using a first-in first-out (FIFO) method. Preferably, upon selection by a user, sound recording data recorded or selected by a user, image data stored in a memory card, sound recording data stored in a flash memory, or image data stored in the flash memory can be set up as the start-sound signal and/or the start-image signal. Descriptions related to the start-sound data and start-image data will be discussed in detail later. In the preferred embodiment, the start-sound data and start-image data stored in the flash memory 505 can be deleted by the user.

Figure 5:
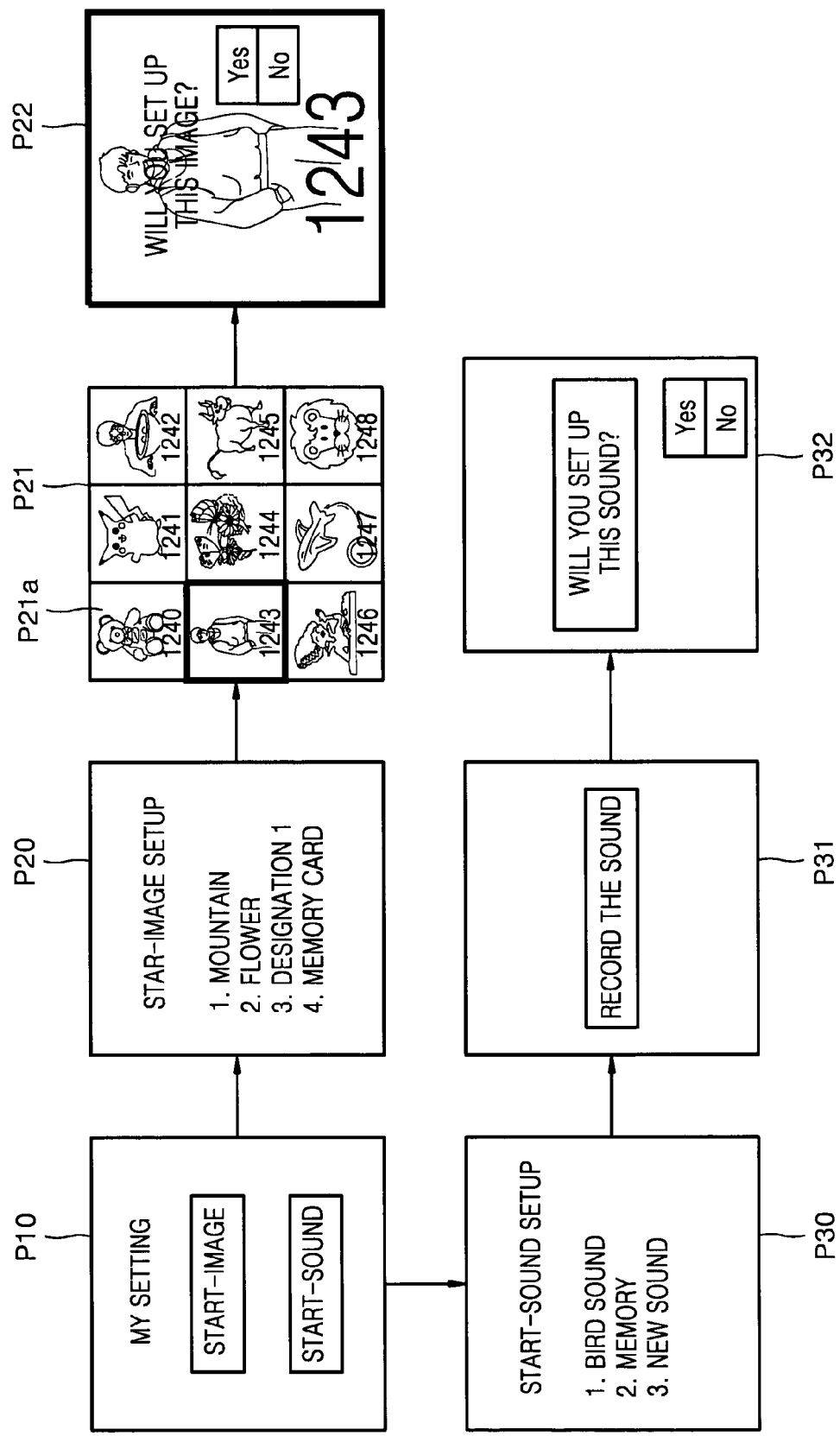
FIG. 5 illustrates a series of steps for start-sound and start-image setting performed in accordance with the principles of the present invention.

Referring to FIGS. 1, 2, and 5, descriptions of the display panel 35 and processes for start-sound and start-image setting steps to be performed utilizing the digital camera of FIG. 4, will now be described in sequence.

When a user selects a start-sound/start-image setting mode using the mode dial 14 and pushes the menu button 38, a menu screen P10 for selecting either a start-sound or a start-image, which are usable as start information signals, is displayed on the color LCD panel 35.

Next, when the user selects the "start-image" using the moving-up button 40up or the moving-down button 40lo and presses down the confirmation/cancellation button 36, a menu screen P20 for setting a start-image is displayed. In the picture P20, for example, "Mountain", "Flower", and "Designation 1" denote menus which have been set as start-images, stored in the flash memory 505 and classified by the user. When the user selects one item, for example, "Memory Card", using the moving-up button 40up or the moving-down button 40lo and presses down the confirmation/cancellation button 36, a menu screen P21 composed of reduced pictures P21a for selectable images stored in a memory card is displayed. Thereafter, when the user selects one reduced picture P21a using the moving-up button 40up, the moving-right button 40ri, the moving-down button 40lo, and the moving-left button 40le and presses down the confirmation/cancellation button 36, a magnified picture P22 for confirming setup of the selected image is displayed. If the user selects "Yes" using the moving-up button 40up and the moving-down button 40lo and presses down the confirmation/cancellation button 36, he or she can set up the image of the confirmed picture as a start-image.

When the menu P10 is displayed on the color LCD panel 35, if the user selects a start-sound menu using the moving-up button 40up or the moving-down button 40lo and presses down the confirmation/cancellation button 36, a menu picture P30 for setting up the start-sound is displayed. In the picture P30, "Bird Sound" and "Melody" denote menus which have been set as start-sounds, stored in the flash memory 505, and classified by the user. When the user selects one item, for example, "New Sound", using the moving-up button 40up or the moving-down button 40lo and presses down the confirmation/cancellation button 36, a menu P31 showing a message "Record the Sound" is displayed. When the user records a desired sound using the microphone MIC and presses down the confirmation/cancellation button 36, a menu P32 for confirming setup of the selected sound is displayed while the recorded sound is being reproduced through the speaker SP. If the user selects "Yes" using the moving-up button 40up and the moving-down button 40lo and presses down the confirmation/cancellation button 36, he or she can set up the recorded sound as a start-sound.

Figure 6A:
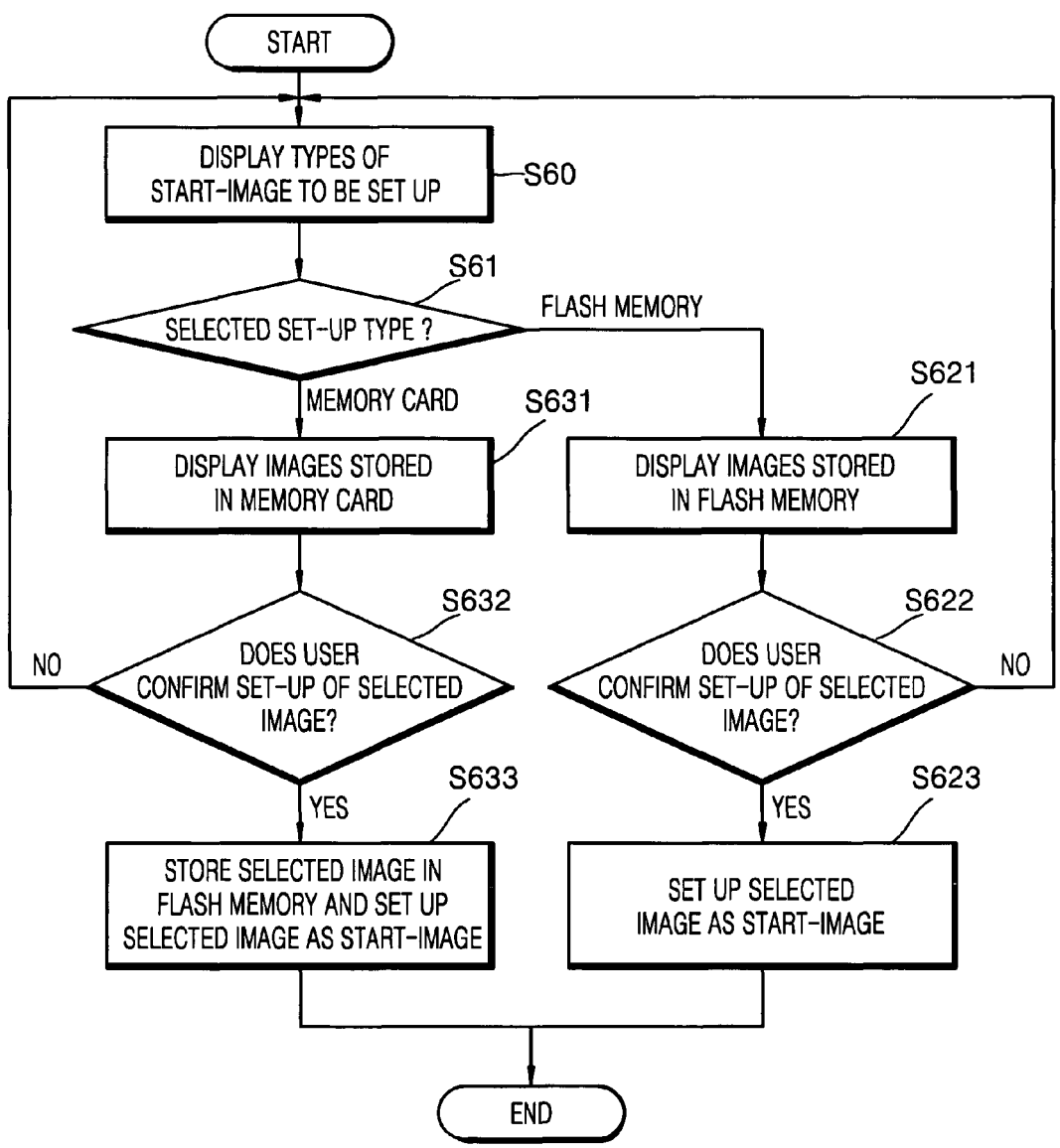
FIG. 6A is a flowchart for illustrating a start-image setting algorithm performed in the micro-controller of the digital camera of FIG. 4.

Referring to FIGS. 4, 5, and 6A, a start-image setting algorithm to be performed in the micro-controller 512 of the digital camera of FIG. 4 will now be described step by step. When the micro-controller 512 receives a start-image setting request via the user input unit INP, it performs a start-image setting algorithm as shown in FIG. 6A.

First, in step S60, the menu P20 showing types of start-images to be set up is displayed.

Next, if the user selects a start-image setup option for selecting an image from those stored in the memory card using the moving-up button 40up or the moving-down button 40lo in step S61, the menu picture P21 composed of reduced pictures for the images stored in the memory card is displayed (step S631). Thereafter, when the user selects one reduced picture P21a using the moving-up button 40up, the moving-right button 40ri, the moving-down button 40lo, and the moving-left button 40le and presses down the confirmation/cancellation button 36, magnified picture P22 for confirming setup of the selected image is displayed. If the user selects "Yes" using the moving-up button 40up and the moving-down button 40lo and presses down the confirmation/cancellation button 36 (step S632), data regarding the selected image is stored in the flash memory 505 and the start-image setup process ends (step S633).

On the other hand, if the user selects a start-image setup option for selecting an image from those stored in the flash memory 505 using the moving-up button 40up or the moving-down button 40lo in step S61, a menu picture composed of reduced pictures for images stored in flash memory 505 is displayed (step S621). Thereafter, when the user selects one reduced picture using the moving-up button 40up, the moving-right button 40ri, the moving-down button 40lo, and the moving-left button 40le and presses down the confirmation/cancellation button 36, magnified picture P22 for confirming setup of the selected image is displayed. If the user selects "Yes" using the moving-up button 40up and the moving-down button 40lo and presses down the confirmation/cancellation button 36 (step S622), data regarding the selected image is stored and the start-image setup process ends (step S623).

Figure 6B:
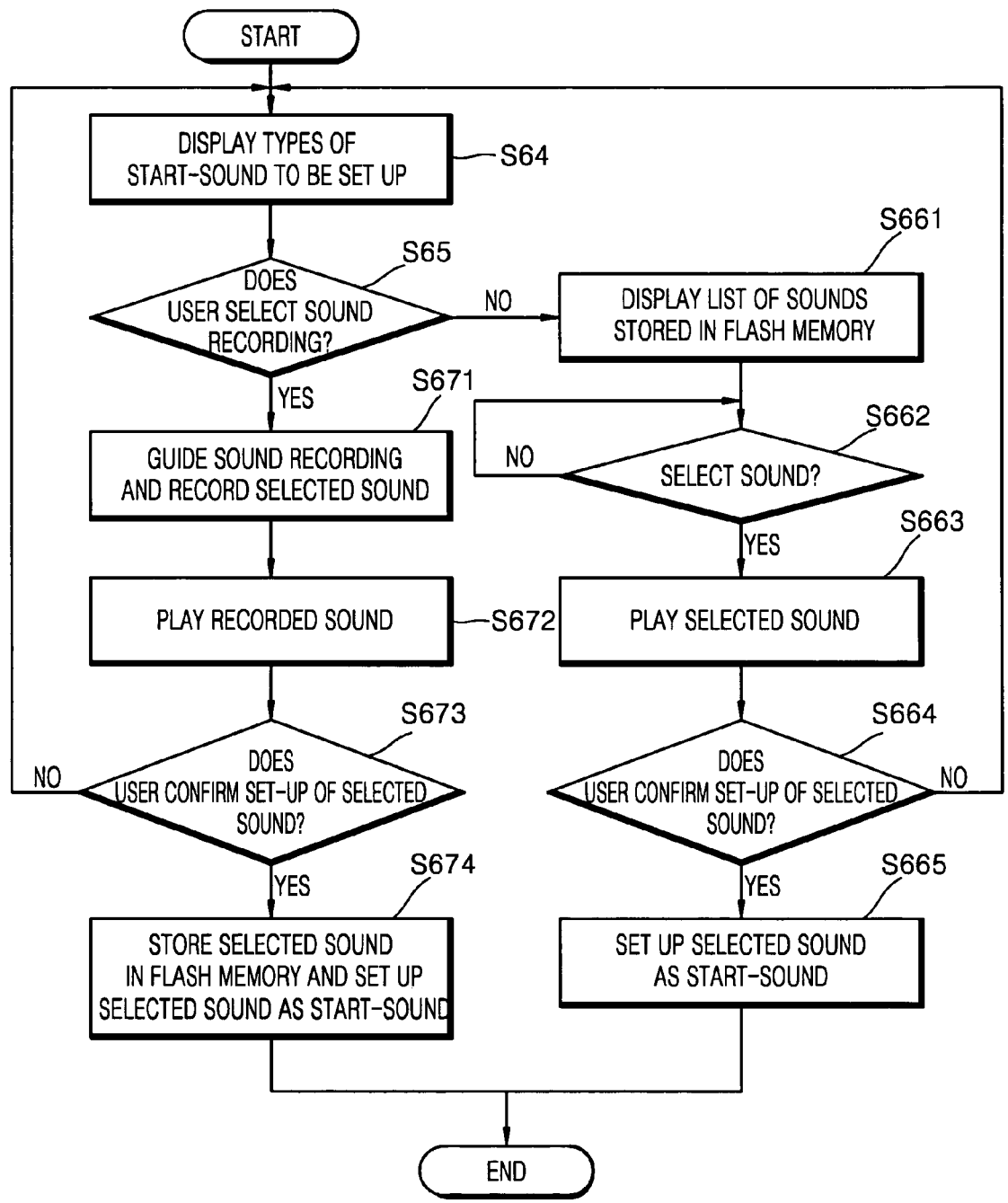
FIG. 6B is a flowchart for illustrating a start-sound setting algorithm performed in the micro-controller of the digital camera of FIG. 4.

Referring to FIGS. 4, 5, and 6B, a start-sound setting algorithm to be performed in the micro-controller 512 of the digital camera of FIG. 4 will now be described step by step. When the micro-controller 512 receives a start-sound setting request via the user input unit INP, it performs a start-sound setting algorithm as shown in FIG. 6B.

First, in step S64, the menu P30 showing types of start-sounds to be set up is displayed.

Next, when the user selects a start-sound setup option for selecting a sound from those stored in the flash memory 505, using the moving-up button 40up or the moving-down button 40lo in step S65, a menu picture for selecting sounds stored in the flash memory 505 is displayed (step S661). Thereafter, when the user selects one sound using the moving-up button 40up, the moving-right button 40ri, the moving-down button 40lo, and the moving-left button 40le and presses down the confirmation/cancellation button 36 (step S662), the magnified picture P32 for confirming setup of the selected sound is displayed while the selected sound is being reproduced (step S663). If the user selects "Yes" using the moving-up button 40up and the moving-down button 40lo and presses down the confirmation/cancellation button 36 (step S664), data regarding the selected sound is stored and the start-sound setup process ends (step S665).

After the step 64, in which the menu P30 showing types of start-sounds to be set up is displayed, if the user selects the sound recording option using the moving-up button 40up or the moving-down button 40lo in step S65, the menu P31 showing a message "Record the Sound" is displayed, and a desired sound is recorded (step S671). After the recording is completed, the menu P32 for confirming setup of the selected sound is displayed while the recorded sound is being reproduced (step S672). If the user selects "Yes" using the moving-up button 40up and the moving-down button 40lo and presses down the confirmation/cancellation button 36 (step S673), data regarding the selected sound is stored in the flash memory 505 and the start-sound setup process ends (step S674).

As described above, in a digital camera and a method of controlling the digital camera according to the present invention, set-up date regarding a start image signal or a start-sound signal is stored in a flash memory. Also, sound recording data selected by a user, image data stored in a memory card, sound recording data stored in the flash memory, or image data stored in the flash memory can be set up as the start-sound signal or the start-image signal. Since the user can immediately set up a start-sound and start-image, the user's convenience is enhanced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An electronic camera capable of setting a start information signal of the electronic camera without utilizing an external computer, the camera comprising:
    a display unit for presenting information and a graphic representation of an object image taken by the camera; and
    a rewritable memory for storing information signals including a plurality of frames of image information;
    wherein the camera comprises a menu option coupled with a user input unit provided in the camera, the menu option and the user input unit enabling a user to select and set up a start information signal through the display unit from the information signals stored in the rewritable memory of the camera without connecting the camera to an external computer for setting the start information signal;
    wherein the start information signal includes a start image and a start sound to be selected from information stored in the rewritable memory of the camera, the menu option and the user input unit further enabling the user to record a sound, the sound recorded being stored in the rewritable memory, and further enabling the user to select the sound recorded as the start sound of the camera.

2. The camera of claim 1, wherein the rewritable memory is a flash memory.

3. The camera of claim 1, further comprising a microcontroller, wherein said selecting and setting up the start information signal through the display unit is enabled via execution of a start information setting algorithm with the microcontroller of the camera without utilizing the external computer.

4. The camera of claim 1 further including an external memory medium attachable to the camera and for storing information signals taken by the camera including a plurality of frames of image information.

5. The camera of claim 4, wherein the external memory medium is capable of storing information signals including a sound representation.

6. The camera of claim 5, wherein the selected start information signal is stored in the rewritable memory.

7. The camera of claim 6, wherein the camera allows selection of the start information signal indicative of at least one frame of image information.

8. The camera of claim 6, wherein the camera allows selection of the start information signal indicative of a sound representation.

9. The camera of claim 6, wherein the camera allows selection of the start information signal indicative of at least one frame of image information coupled with a sound representation.

10. The camera of claim 4, wherein the external memory medium is a memory card.

11. The camera of claim 1 further including user input means for facilitating the selection of a start information signal.

12. A method of operating a digital camera which displays an object image while generating a digital image signal from light received from the object, stores the digital image signal in a memory medium attachable to the camera, and is capable of reproducing, at startup of the camera, a start information signal which can be set up by the user without utilizing an external computer for setting the start information signal, the method comprising the steps of:
    recording or inputting a sound data;
    storing the sound data in a flash memory of the camera for selection by the user as a start sound of the camera;
    setting up a start information signal with a user input unit coupled with a menu option for setting the start information signal, said setting-up the start information signal being performed, through execution of a start information setting algorithm with a microcontroller of the camera and without ever connecting the camera to an external computer for selecting, configuring, customizing or setting the start information signal by the external computer, by selecting desirable start information from a group consisting of the sound data recorded or inputted by the user, image data stored in the memory medium, the sound data stored in the flash memory of the camera, and image data stored in the flash memory; and
    storing data regarding the set-up of the start information signal in the flash memory.

13. The method of claim 12, wherein in the setting up step, when the start information signal is a start-image, a list of images stored in either the memory medium or the flash memory is presented for the selection by the user, and an image selected by the user is set up as the start-image.

14. The method of claim 12, wherein in the setting up step, when the start information signal is a start-sound, the user is allowed either to select from a list of sounds stored in the flash memory or to receive sound-recording data from the user for using as a start information signal.

15. The method of claim 12, wherein in the storing step, after an image data or a sound data is selected as the start information signal in the setting up step, the selected start information signal is stored in the flash memory.

16. An electronic camera capable of setting a start information signal of the electronic camera without utilizing an external computer, the camera comprising:
- a display unit for presenting information and a graphic representation of an object image taken by the camera;
- a memory card interface for interfacing with a memory card of a user and saving the object image taken by the camera;
- a flash memory coupled with a digital signal processor and for storing operation information for the camera;
- a user input unit for operating and setting up functions of the camera; and
- a menu option coupled with the user input unit of the camera, the menu option and the user input unit enabling a user to select and set up a start information signal to be reproduced when power is applied, said selecting and setting up to be performed through the display unit without connecting the camera to an external computer for selecting, configuring, customizing or setting up the start information signal by the external computer, the start information signal including a start image and a start sound to be selected from information stored in the flash memory of the camera and in the memory card of the user;
- the menu option and the user input unit further enabling the user to record a sound, the sound recorded being stored in the flash memory, and further enabling the user to select the sound recorded as the start sound of the camera.

17. The camera of claim 16, further comprising a microcontroller, wherein said selecting and setting up the start information signal is performed via execution of a start information setting algorithm with the microcontroller of the camera without utilizing the external computer.

\* \* \* \* \*